Figure 1:
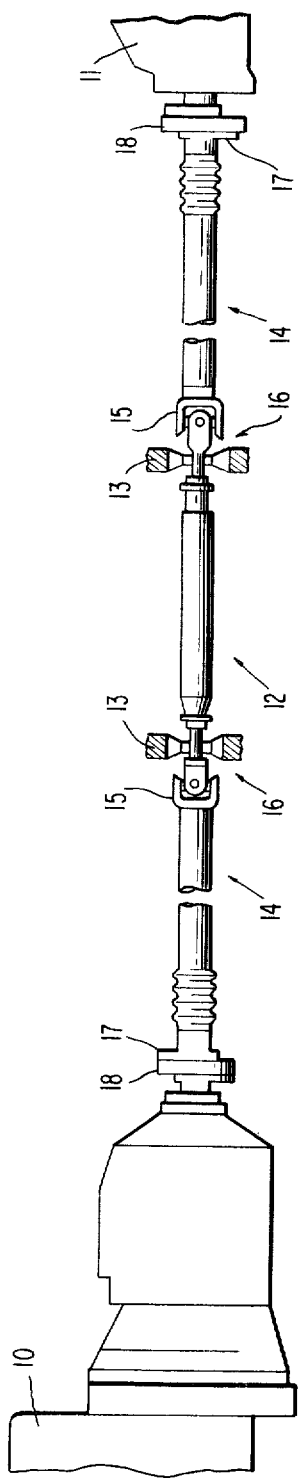

United States Patent [19]
Van Winsen et al.

[11] 3,903,982
[45] Sept. 9, 1975

[54] DRIVE SHAFT FOR VEHICLES, ESPECIALLY FOR MOTOR VEHICLES

[75] Inventors: Friedrich H. Van Winsen, Kirchheim; Joachim H. Sorsche, Stuttgart; Erwin Sommer, Esslingen-Waldenbronn, all of Germany

[73] Assignee: Daimler-Benz Aktiengesellschaft, Germany

[22] Filed: Nov. 15, 1972

[21] Appl. No.: 306,875

[30] Foreign Application Priority Data
Nov. 16, 1971 Germany............................ 2156783

[52] U.S. Cl................. 180/70 R; 64/11 R; 74/470; 180/82 R
[51] Int. Cl............................................ B60k 17/22
[58] Field of Search.............. 180/70, 82 R; 74/470; 64/1 C, 11 R, 11 B, 1 R, 1 S

[56] References Cited
UNITED STATES PATENTS
2,098,703 11/1937 Geyer............................ 64/11 R
2,166,376 7/1939 Saurer............................ 64/11 R
3,555,851 1/1971 Ulderup......................... 64/11 R FOREIGN PATENTS OR APPLICATIONS
763,089 12/1956 United Kingdom.............. 64/11 B

*Primary Examiner*—Richard A. Schacher
*Attorney, Agent, or Firm*—Craig & Antonelli

[57] ABSTRACT

A drive shaft for vehicles, especially for motor vehicles in which a driving engine is connected with an axle drive by way of a shaft assembly equipped with universal joints and possibly supported also by intermediate bearing supports; an axial deformation member is incorporated into this shaft assembly at least at one place which, nevertheless, transmits at the same time the torque; preferably, however, one deformation member each is coordinated to the driving engine and to the axle drive which may be arranged symmetrically to one another.

5 Claims, 2 Drawing Figures

PATENTED SEP 9 1975   3,903,982

DRIVE SHAFT FOR VEHICLES, ESPECIALLY FOR MOTOR VEHICLES

The present invention relates to a drive shaft for vehicles, especially for motor vehicles, whereby a driving engine is connected with an axle drive by way of a shaft assembly equipped with joints and possibly supported also by intermediate bearing supports.

The closer examinations of frontal impact tests of passenger motor vehicles have produced a sequence of movements of approximately the following type:

After the compression of the bumper and of the radiator portion, the engine is pushed rearwardly against the front end wall. During this course, the engine braces itself at the rear axle by way of the drive shaft until the drive shaft buckles and breaks off. The heavy rear axle together with the body now further telescopes the body by way of its mounting points at the frame or superstructure so that deformations may occur at the passenger cell.

The present invention is therefore concerned with the task to cause impact energy to be absorbed at the vehicle by energy-dissipating parts and to utilize for that purpose also the drive shaft or universal joint shaft between the engine and the axle drive. Consequently, a drive shaft or universal joint shaft is to be created which is capable of dissipating axial impact energy.

The underlying problems are solved according to the present invention with the aforementioned arrangements in that an axial deformation member is interconnected in this shaft assembly or shaft train at least at one place whereby the axial deformation member at the same time transmits the torque.

A solution is thereby preferred according to which one deformation member each is coordinated to the axle drive and the driving engine and these two deformation members are arranged symmetrically to one another. According to a further inventive proposal, the two deformation members may thereby be constructed identically.

The drive or universal joint shaft constructed according to the present invention offers the advantage that it can absorb axial impacts by deformation and is thereby able to at least partially dissipate the impact energy. Additionally, it is simple and inexpensive in the manufacture as no additional parts are required.

In one embodiment according to the present invention, the deformation member is constructed as undulated tubular member. Another possibility of the present invention resides in that the deformation member is constructed as invertable structure consisting of two tubular portions of different diameter and of a connecting portion approximately perpendicular to the axis and serving for the preforming of a roller-bellows-like fold. In both cases, the arrangement can be made in such a manner that the deformation member passes over, on the one hand, into one joint part of a cardan joint or universal joint and, on the other, into the flanged part of an elastic coupling, for example, of a so-called Hardy disk. It is also possible according to the present invention to construct the deformation member as a multi-stepped invertable assembly. Several tubular sections of different diameter are thereby disposed in a step-like manner to one another. Also, the symmetrical arrangement of two identical or similarly constructed invertable assemblies in one shaft section is within the scope of the present invention.

Accordingly, it is an object of the present invention to provide a drive shaft for vehicles, especially for motor vehicles which avoids by simple means the aforementioned shortcomings and drawbacks encountered in the prior art.

Another object of the present invention resides in a drive shaft for vehicles, especially for motor vehicles which is capable of absorbing impact energy by way of torque-transmitting, energy-dissipating parts incorporated in the drive shaft.

A further object of the present invention resides in a drive shaft for motor vehicles which is capable of absorbing impact energy, yet is relatively simple and inexpensive in manufacture.

Figure 2:
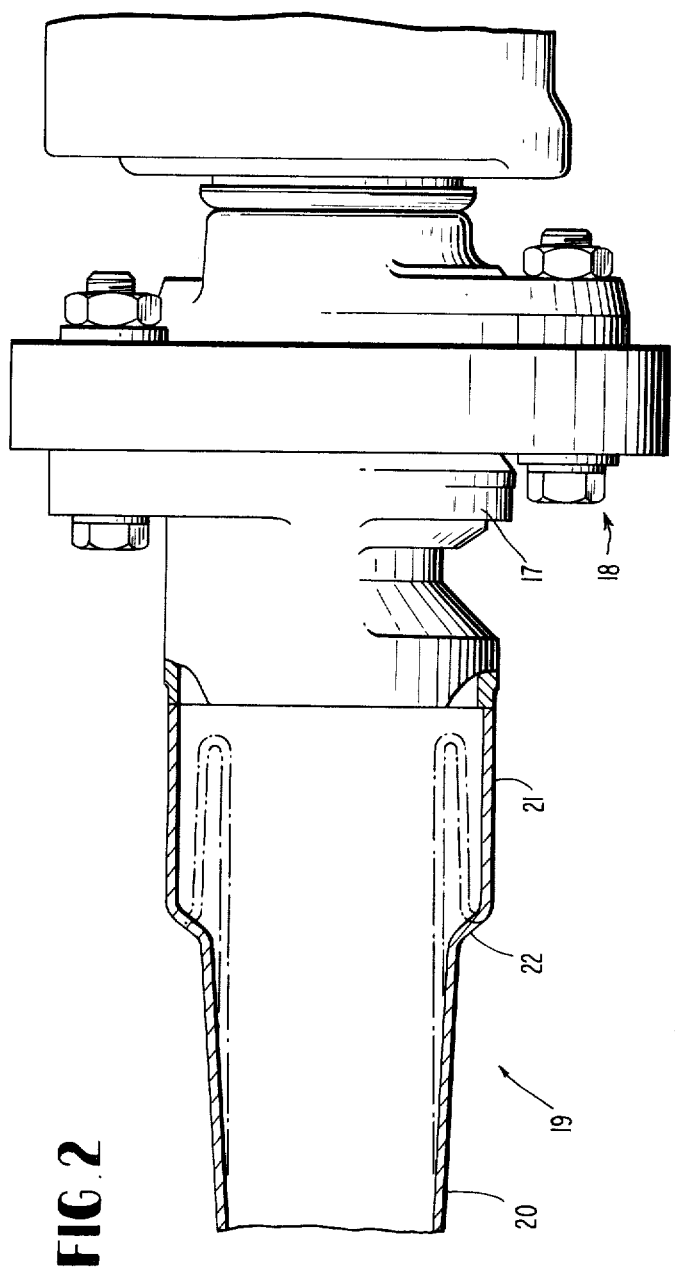

These and further objects, features and advantages of the present invention will become more apparent from the following description when taken in connection with the accompanying drawing which shows, for purposes of illustration only, two embodiments in accordance with the present invention, and wherein:

FIG. 1 is a schematic side view of a first embodiment of a drive shaft arrangement in accordance with the present invention; and FIG. 2 is a partial side elevational view, partly in cross section and on an enlarged scale, of a modified embodiment in accordance with the present invention.

Referring now to the drawing wherein like reference numerals are used throughout the two views to designate like parts, and more particularly to FIG. 1, the drive shaft or universal joint shaft 12 is arranged between the engine block 10, not illustrated in detail, and the axle drive 11 which is also not illustrated in detail since they are of conventional construction. The drive shaft or universal joint shaft 12 is supported with respect to the vehicle frame by way of two bearing supports 13 of any conventional type. The drive shaft 12 includes two deformation members generally designated by reference numeral 14 which, as such, are constructed identically. One deformation member 14 is coordinated to the engine 10 and the other to the axle drive 11. They are disposed symmetrically with respect to one another, so to speak of.

The deformation members 14 are constructed in this embodiment as undulated tubular members of conventional type. The undulated construction can thereby extend over the entire length of the deformation member 14 or only over a portion thereof. The undulated tubular members 14 at their mutually facing ends pass over into the joint parts 15 of the cardan joints generally designated by reference numeral 16. At their other ends, they are operatively connected with the flange part 17 of the elastic coupling 18.

The operation of this arrangement is believed apparent. As soon as the engine is pushed rearwardly in case of a frontal impact, the tubularly shaped deformation members 14 absorb the impact energy at least in part.

According to FIG. 2 the deformation member generally designated by reference numeral 19 is constructed as a so-called invertable or telescoping assembly. It includes two tubular sections 20 and 21 of different diameters which are connected with each other by a connecting portion 22. A fold is preformed by means of this connecting portion 22 which in case of axial impacts inverts roller-bellows-like into the interior of the tubular section 21—as illustrated in dash and dot lines. For that purposes, the connecting portion 22 is constructed more or less conically and can be disposed at least in its outer area essentially perpendicular to the axis of the drive shaft. The tubular section 21 of larger diameter passes over—as described already in connection with FIG. 1—into the flanged part 17 of the elastic coupling disk generally designated by reference numeral 18. Also, this joint shaft or drive shaft can dissipate axial impact energy by means of the illustrated invertable construction of its deformation member 19.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A drive shaft arrangement for vehicles, especially motor vehicles having a driving engine and an axial drive, the arrangement comprising: a drive shaft provided with joint means for operatively connecting the driving engine with the axle drive, and means for transmitting torque and dissipating axial impact energy of the drive shaft including at least one axial deformation means inserted into said drive shaft, said axial deformation means including at least two tubular sections of different diameter, said tubular sections being spaced from each other in an non-overlapping relationship along the axial direction of the drive shaft, and a connecting portion disposed approximately normal to the axis of the drive shaft and extending between adjacent end portions of said spaced tubular sections, said connecting portion serving for the deformation of a roller-bellows-like fold whereby upon application of an axial impact force on the drive shaft the axial impact energy is dissipated by one of said tubular sections telescoping into the other of said tubular sections.

2. A drive shaft according to claim 1, wherein intermediate bearing support means are provided for supporting the drive shaft at the vehicle.

3. A drive shaft according to claim 1, wherein at least one deformation means each is coordinated to the driving engine and the axle drive, said deformation means being arranged essentially symmetrically to one another.

4. A drive shaft according to claim 3, wherein said deformation means are constructed identically.

5. A drive shaft according to claim 1, wherein said deformation means is of a multi-step construction.

* * * * *